July 19, 1960

H. M. LITTLE ET AL 2,945,538

CODING APPARATUS FOR INFORMATION STORAGE TAPES AND THE LIKE

Filed July 1, 1957

3 Sheets-Sheet 1

INVENTORS
HOWARD M. LITTLE
JOHANNES K. NOTTHOFF
BY Forest J. Lilly
ATTORNEY

July 19, 1960 H. M. LITTLE ET AL 2,945,538

CODING APPARATUS FOR INFORMATION STORAGE TAPES AND THE LIKE

Filed July 1, 1957 3 Sheets-Sheet 2

INVENTORS
HOWARD M. LITTLE
JOHANNES K. NOTTHOFF
BY [signature]
ATTORNEY

July 19, 1960 H. M. LITTLE ET AL 2,945,538

CODING APPARATUS FOR INFORMATION STORAGE TAPES AND THE LIKE

Filed July 1, 1957 3 Sheets-Sheet 3

INVENTORS
HOWARD M. LITTLE
JOHANNES K. NOTTHOFF
BY [signature]
ATTORNEY

United States Patent Office 2,945,538

Patented July 19, 1960

2,945,538

CODING APPARATUS FOR INFORMATION STORAGE TAPES AND THE LIKE

Howard M. Little and Johannes Karl Notthoff, Los Angeles, Calif., assignors to Unicorn Engineering Corporation, Los Angeles, Calif., a corporation of California Filed July 1, 1957, Ser. No. 669,348

10 Claims. (Cl. 164—113)

This invention relates generally to automatic control apparatus, and more particularly to apparatus for coding information storage tapes of the type used in automatic control devices.

Numerous automatic control devices for machines and the like utilize a control tape which is preformed with coded control information, such as a series of perforated control groups, for effecting automatic, preselected, sequential operation of the controlled machine. The control tape is intermittently advanced through a sensing device which senses the control groups in sequential order. Associated with this sensing device is a suitable control system which is operative, in response to the sensing of each control group on the tape, to operate a controlled machine in accordance with the coding of the respective control groups.

Examples of automatic control systems embodying such coded information storage tapes are disclosed in copending applications, Serial No. 589,989, filed June 7, 1956, entitled Light Modulating Apparatus for Film Printer; Serial No. 531,879, filed September 1, 1955, entitled Automatic Control System for Film Printing Machines and the Like; and Serial No. 609,714, filed September 13, 1956, and entitled Automatic Fade Device. The first two of these applications disclose motion picture film printing machines wherein the printing light intensity is periodically, automatically modulated in accordance with the coding of the control groups on a control tape, so as to achieve the desired light density in several scenes of the film being printed. The third application discloses a film printing machine wherein automatic modulation of a printing light beam and automatic operation of a dissolve mechanism are accomplished through the employment of a coded information storage tape of the character mentioned above.

In each of these film printing machines, coding of the control tape is accomplished by perforating the same, the coding of each control group being dependent on the number and position of perforations in each control group on the tape. In the printing machines of the first two mentioned applications, a so-called five hole tape is employed wherein each control group may contain from one to five perforations. As discussed more fully in these applications, each control group may be coded or perforated to correspond to a selected one of thirty different exposure values, a condition of five perforations in a control group being reserved for effecting automatic terminaton of the printer.

The control tape employed in the third of the above-mentioned co-pending applications employs a so-called eight hole tape, wherein each control group has eight control positions in which a perforation may be formed. Five of these control positions are reserved for controlling the printing light intensity, the remaining three control positions being utilized for controlling the automatic dissolve mechanism. Thus, in the control tape of the latter printing machine, each control position is preformed with one or more perforations in the light intensity control, or exposure, section of the tape and may, or may not, depending on whether or not operation of the dissolve mechanism is desired, contain one or more perforations in the dissolve section of the tape.

The illustrative embodiment of the present invention is especially designed for coding so-called eight hole control tape of the type used in the latter type of film printing machine. It will become apparent, as the description proceeds, however, that the invention may be used for coding information storage tape to be used with automatically controlled machines other than film printing machines and that coding of the tape may be accomplished other than by perforating the same.

A broad object of the present invention is the provision of apparatus for coding information storage tape of the character described.

A more specific object of the invention is the provision of apparatus for coding information storage tape of the type wherein discrete bits of control information are contained in a plurality of coded control groups, each defining a series of control positions adapted to be selectively formed with control indicia and wherein the coding of each control group is based on the number and location of the control indicia in each control group.

Another object of the invention is the provision of tape coding apparatus as in the foregoing which comprises a keyboard embodying a plurality of manually depressable keys or buttons, depression of each of which results in the formation of one or more control indicia in preselected control positions of each control group on the control tape.

Another object of the invention is the provision of tape coding apparatus as in the foregoing, wherein a first group of keys on the keyboard are operative to effect the formation of control indicia in certain of the control positions of each control group and a second set of keys are operative to control the formation of control indicia in another set of control positions in each control group of the tape and wherein the apparatus is operative in response to actuation of any key in said first group of keys to first form the appropriate control indicia on the tape and subsequently advance the tape to the next control group position, and wherein the formation of control indicia in the said second group of control positions in each control group and advancing of the tape is accomplished by first actuating the preselected one of the second set of keys and thereafter actuating a preselected one of the first set of keys.

A further object of the invention is the provision of tape coding apparatus of the character described wherein the keyboard is provided with additional keys for selectively automatically advancing the tape through the apparatus and for providing a given control group with a predetermined coding to serve as stop information for causing automatic termination of the controlled machine, for example.

Yet a further object of the invention is the provision of tape coding apparatus of the character described which is especially suited to the formation of perforated control tape for use in automatically controlled motion picture film printing machines.

Still a further object of the invention is the provision of tape coding apparatus of the character described which is relatively simple in construction and operation, inexpensive to manufacture, and otherwise especially well suited to its intended purpose.

Other objects, advantages and features of the invention will become apparent as the description proceeds.

Briefly, the foregoing and other objects and advantages are achieved in the illustrative embodiment of the invention by the provision of a keyboard which is electrically connected to a tape perforator. This perforator comprises a series of eight punches past which the tape to be coded is fed. The punches are arranged in a row extending transverse to the direction of tape movement.

Embodied in the perforator are means for effecting selective operation of the punches to perforate the tape and means for effecting intermittent advancing of the tape a predetermined distance relative to the punches so as to enable successively different portions of the tape to be aligned with the punches.

The illustrative keyboard perforator is especially designed for producing perforated control tape for use with a film printing machine of the character disclosed in the aforementioned co-pending application, Serial No. 609,-714. To this end, five of the eight control positions in which perforations are adapted to be preformed by operation of five punches of the perforator are reserved for controlling printing light intensity in the film printer, the remaining three control positions corresponding to the remaining three punches of the perforator, being reserved for controlling operation of the dissolve mechanism embodied in the latter printer. Each of the first group of five control positions in each control group are assigned numerical values in accordance with the geometric series 1, 2, 4, 8 and 16. The equivalent numerical value of any control group is the sum of the individual numerical values of control positions containing a perforation.

The keyboard of the present coding apparatus is provided with thirty manually depressable exposure keys bearing numerical labels from 1 to 30. Embodied in the keyboard is electrical circuitry which is operative in response to depression of any one of these thirty keys to cause operation of that punch or those punches of the perforator which will yield a control group having an equivalent numerical value equal to the numerical value displayed on the operated key. Depression of any one of the thirty exposure keys also effects automatic advancing of the tape past the punches of the perforator to align a succeeding unpunched portion of the tape with the punches.

Also embodied in the keyboard are a set of six dissolve keys which are adapted to be selectively depressed for perforating the dissolve section of the tape in any one of the six combinations, corresponding to six different dissolve rates, possible with the three punches associated with this latter section of the tape. These six keys of the keyboard bear indicia denoting the different dissolve rates.

The keyboard embodies a final set of three keys which are operative, respectively, to cause automatic threading of the tape through the perforator, to cause advancing of the tape a predetermined distance, corresponding to the spacing between adjacent control groups on the tape, and to operate all five punches in the exposure section of the tape, so as to preform in a control group a five hole condition. As discussed in our copending applications, this five hole condition is utilized for causing automatic termination of the printer. Finally, the keyboard embodies a counter for indicating the number of control groups which have been formed on the tape.

The control circuitry embodied in the present keyboard perforator is such that depression of any one of the thirty exposure keys automatically effects perforating of the exposure section of the tape and subsequent automatic advancing of the tape to a succeeding unpunched position. Depression of any one of the dissolve keys of a keyboard, however, merely preconditions the perforator for operation of the punch or punches corresponding to the depressed dissolve key. The actual perforating operation occurs in response to subsequent depression of a preselected one of the thirty exposure keys. Thus, to perforate the exposure section of the tape, it is necessary only to depress one of the exposure keys while perforation the dissolve section of the tape requires initial depressi of one of the dissolve keys and subsequent depressi of one of the exposure keys.

A better understanding of the invention may be h from the following detailed description thereof, tak in connection with the accompanying drawings, where:

Figure 5:
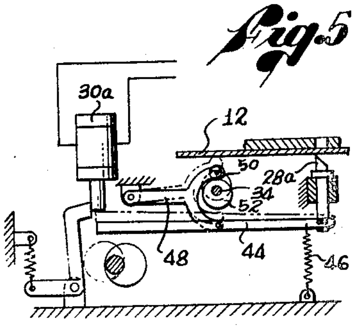
Figure 6:
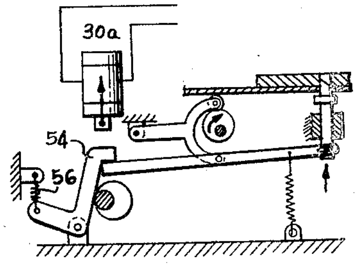
Figure 7:
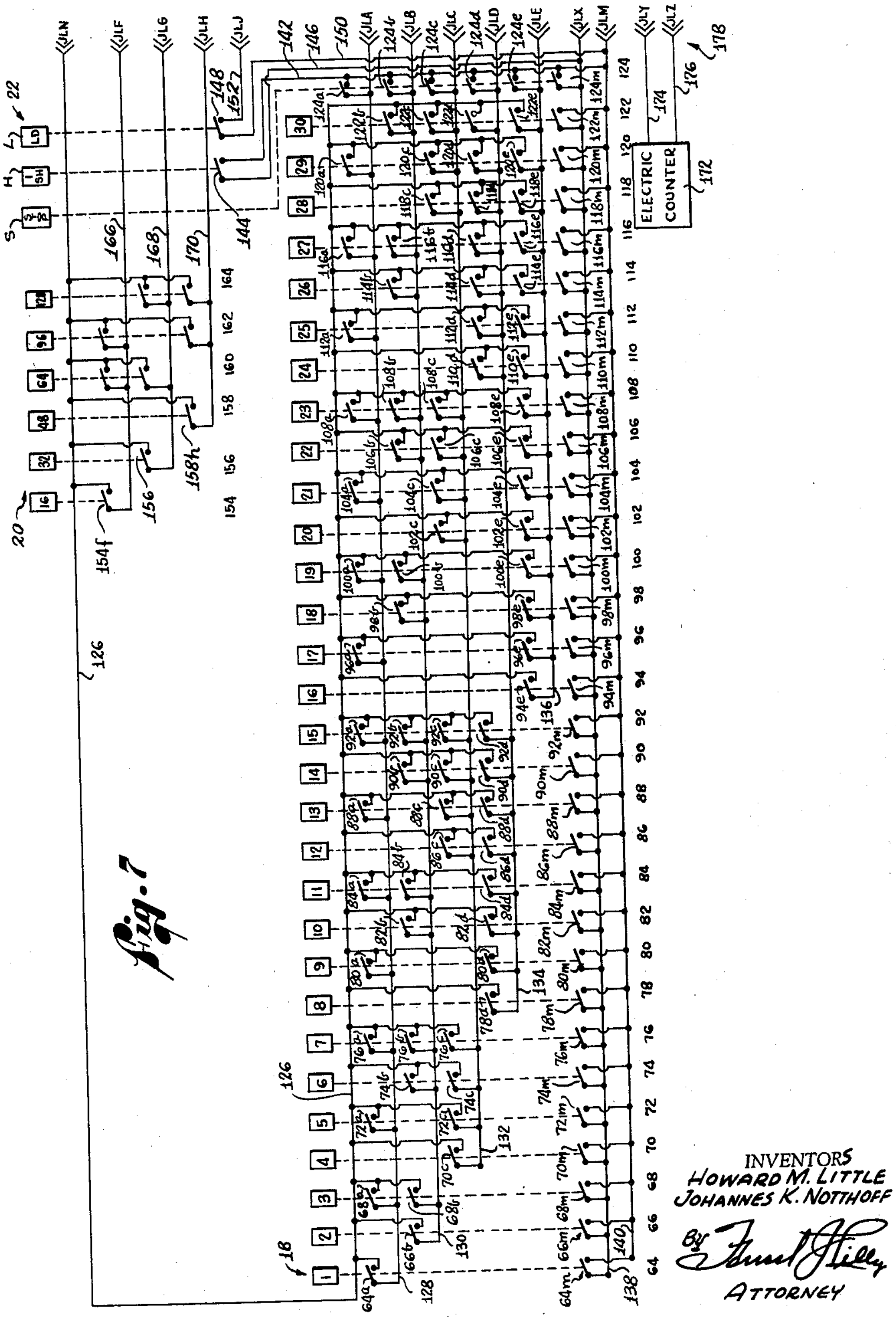
Figure 8:
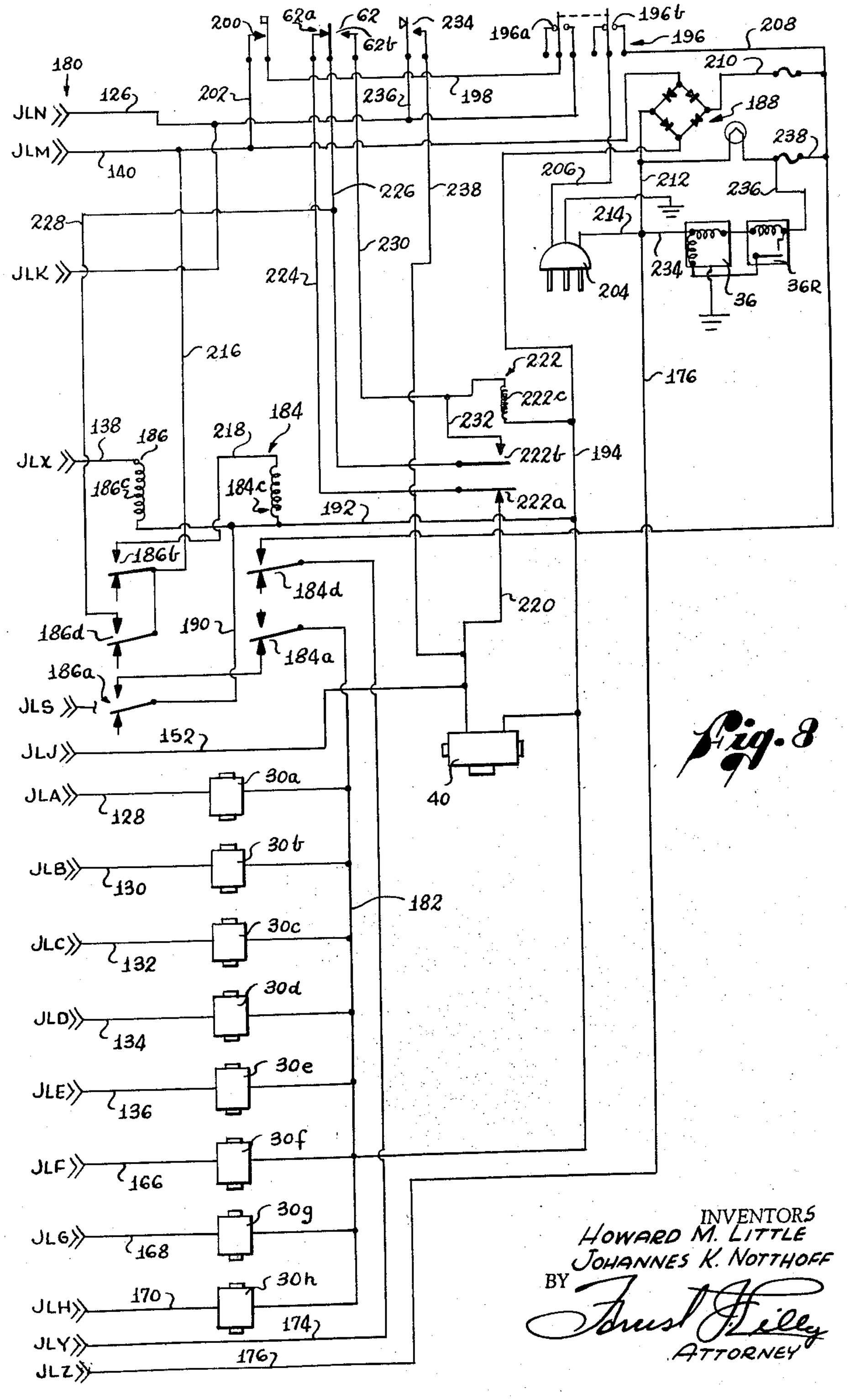

Figures 5 and 6 diagrammatically illustrate cert punch operating mechanism embodied in the present k board perforator;

Figure 7 is a schematic circuit diagram of the k board unit of the present keyboard perforator; and Figure 8 is a schematic circuit diagram of the p forator unit of the present keyboard perforator.

Figure 1:
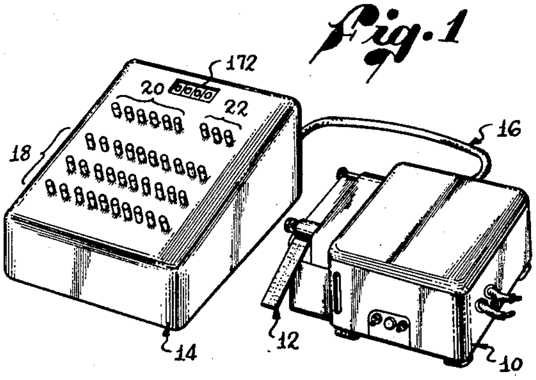
Figure 1 is a perspective view of the present keybo perforator.

Referring first to Figure 1, the present keyboard p forator will be seen to comprise a perforator unit through which tape 12 to be coded is fed, and a k board unit 14 for effecting selective operation of perforator unit 10. These units are electrically connec by a cable 16.

Keyboard unit 14 embodies a first series of thirty k generally indicated at 18, which are hereinafter refer to as exposure keys, a second set of six keys, gener indicated at 20, which are hereinafter referred to as solve keys, and a third set of three keys, generally i cated at 22, which will be presently more fully discus These keys are adapted to be selectively operated in manner hereinafter described to cause perforation of t 12 in a preselected manner.

Figure 3:
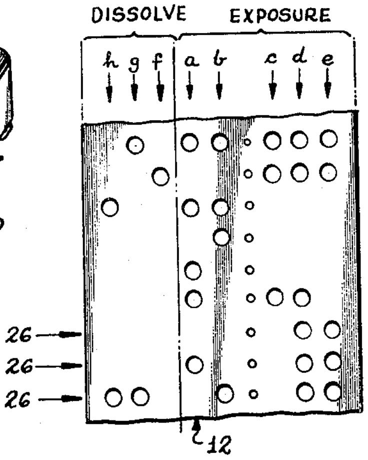
Figure 3 is a diagrammatic illustration of a cont tape produced by the present keyboard perforator.

A section of tape 12 which has been perforated by s preselected operation of the keys on the keyboard 14 is illustrated in Figure 3. As previously mentio and hereinafter more fully described, the punches wl form the perforations P in the tape 12 during opera of the apparatus are arranged in a row extending tr versely to the direction of tape movement. As a re in the perforated tape, the perforations P are arrange a series of rows 26, extending transversely to the le of the tape and in a series of columns, identified by letters *a* through *h*, extending lengthwise of the tape Each of the rows 26 of perforations is hereinafte ferred to as a control group. As previously discu and hereinafter more fully described, each of the co groups 26 may contain a perforation in one or mor eight positions, hereinafter referred to as control tions, spaced transversely of the tape. Each of t control positions is located in one of the colum through *h*, such control positions, therefore, being inafter identified by the letters *a* through *h*.

Thus, in the lowermost control group 26 illustrate the tape of Figure 3, perforations are contained in control positions *b*, *d*, *e*, *g* and *h*. As will presentl come clear, the exposure keys 18 on the keyboar are operative to form one or more perforations P i right-hand section of the tape containing control tions *a* through *e*. This section of the tape has, t fore, been identified in Figure 3 by the word "expos Similarly, the dissolve keys 20 on the keyboard 1 operative to form perforations in the left-hand se of tape 12 containing control positions *f*, *g* and *h*. latter section of tape 12, therefore, has been iden in Figure 3 by the word dissolve.

As previously indicated and discussed in our a mentioned co-pending applications and as will be inafter more fully discussed, the exposure control tions *a* through *e* are assigned numerical values ac ing to the geometric series 1, 2, 4, 8 and 16, control position *a* bearing the numerical value of 1 and control position *e* bearing the numerical value of 16. The equivalent numerical value of any control group is, as previously mentioned, the sum of the individual numerical values of the exposure control positions containing a perforation P.

Thus, the equivalent numerical value of the lowermost control group 26 on the control tape, containing perforations in control positions *b*, *d* and *e*, has an equivalent numerical value of 26, while the second control group 26 from the bottom of the tape in Figure 3 has an equivalent numerical value of 25, and so on. It will be immediately apparent that the exposure section of each control group 26 may be perforated in such a manner as to yield an equivalent numerical value ranging from 1, corresponding to a condition wherein the control group contains a perforation only in control position *a* to 31, corresponding to a condition wherein a control group contains perforations in all five control positions *a* through *e*.

The film printers of our aforementioned copending applications are designed to yield thirty different predetermined printing light intensities or exposure values identified by the numerals 1 through 30. During operation of those film printers, the perforated control tape, such as produced by the present keyboard perforator, is intermittently fed through a tape reader. Associated with this tape reader is an automatic control system which is operative in response to the sensing of each of the control groups on the tape to establish a printing light intensity or exposure value corresponding to the equivalent numerical value of the sensed control group.

Figure 2:
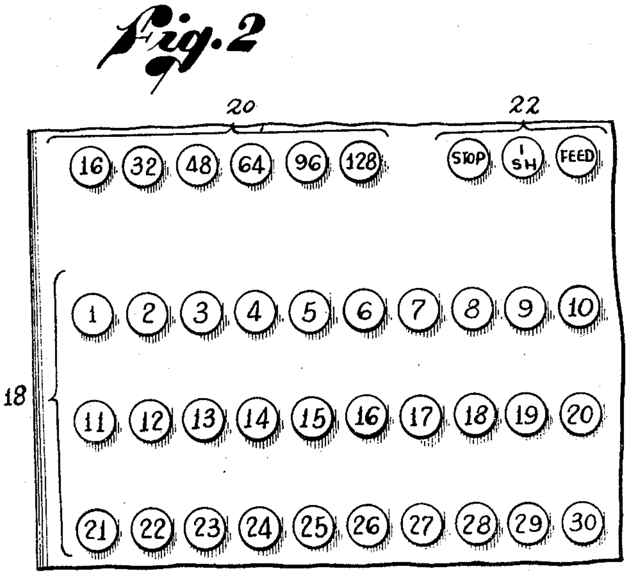
Figure 2 is an enlarged view of a section of the pres keyboard perforator.

For this reason then, the thirty exposure keys 18 of the keyboard 14 bear numerical labels ranging from 1 through 30, corresponding to the thirty printer exposure values, as will be observed in the enlarged keyboard illustration of Figure 2. The subsequently described control circuit embodied in the present keyboard perforator is so arranged that depression of any one of the exposure keys 18 will result in perforation of the tape 12 in such manner as to yield an equivalent numerical value corresponding to the numerical label on the depressed key. For example, depression of the exposure key labeled 26 would result in perforation of the tape 12 in the manner illustrated in the lowermost control group 26 (Figure 3) of the tape.

As mentioned above, the control positions *f*, *g* and *h*, contained in the left-hand, dissolve section of the tape 12, are reserved for effecting automatic control over the dissolve mechanism disclosed in the aforementioned co-pending application Ser. No. 609,714. It will be apparent that the dissolve section of each control group 26 may be formed with six different combinations of perforations. The arrangement of the control circuit of the present keyboard perforator is such that any preselected one of these six combinations of perforations may be formed in the dissolve section of the tape by depression of one of the six dissolve keys 20. As described in the last-mentioned co-pending application, each of these six possible perforation combinations are used to establish a predetermined dissolve rate measured in number of frames over which the dissolve occurs.

To this end, the six dissolve keys 20 bear numerical labels (Figure 2) 16, 32, 48, 64, 96 and 128, respectively, which indicate the dissolve rate established by the perforation combination formed when the respective key is depressed. Thus, operation of dissolve key 48 will result in the formation of a perforation combination in the dissolve section of the tape which effects operation of the dissolve mechanism embodied in the aforementioned printer at a 48 frame rate.

The electromechanical control mechanism embodied in the present keyboard perforator will now be described with reference to Figures 4 through 8. The perforator unit 10, which is in most part of conventional design, is diagrammatically illustrated in Figure 4. This perforator 10 comprises in a known manner a row of eight perforating punches 28, past which the tape 12 is intermittently advanced. Briefly, during use of the present apparatus, one or more preselected ones of the punches 28 are momentarily elevated in response to each actuation of the keyboard unit 14 to form a perforated control group 26 on the tape 12. The tape is thereafter advanced a short distance to align a succeeding portion of the tape with the punches 28, and thereby condition the apparatus for forming the next control group.

Indicated at 30*a* through 30*h* are a series of eight solenoids each associated with a respective one of the eight punches 28. These eight solenoids are selectively energized in accordance with the actuation of the keys on the keyboard unit 14 to preselect, for subsequent operation, the punches 28 corresponding to the depressed keys. Actual elevation of the punches 28, which have been preselected by energizing of one or more of the solenoids 30*a* through 30*h* is accomplished by a punch elevating mechanism diagrammatically indicated at 32. This elevating mechanism 32 is driven by a rotary shaft indicated in diagrammatic fashion at 34 which, in turn, is driven from a motor 36 through a one revolution clutch 38.

As will be presently more fully appreciated, motor 36 is continuously energized during operation of the apparatus while shaft 34 is driven only in response to actuation of the one revolution clutch by means of a solenoid 40. This clutch solenoid, as well as the punch presetting solenoids 30*a*–30*h*, are controlled from circuitry, generally indicated at 42, embodied in the perforator unit.

Returning to the punch operating mechanism 32, the latter actually comprises a series of eight separate mechanical mechanisms, each associated with a respective one of the punches 28, and operated from common shaft 34. One of these mechanisms, namely, that associated with punch 28*a* is diagrammatically illustrated on enlarged scale in Figures 5 and 6.

This mechanism is conventional and will only be briefly described here so as to afford a clearer understanding of the overall operation of the present keyboard perforator. As shown in Figures 5 and 6, the punch operating mechanism comprises a lever 44, one end of which is fixed to the lower end of the punch 28*a* by the key and slot arrangement illustrated. This end of the lever 44 is biased in a downward direction, as viewed in the drawings, to retract the punch 28*a* clear of the tape 12 by means of a tension spring 46.

Lever 44 is hinged at an intermediate point to a rocker arm 48 which is pivoted at one end to the stationary framework of the perforator housing. The opposite end of the rocker 48 forms a yoke to one arm of which the lever 44 is pivoted, as just mentioned.

The other arm of this yoke mounts a cam follower roller 50 which rides on an accentric 52 fixed to the aforementioned drive shaft 34. From the description of the punch operating mechanism thus far, it will be clear that rotation of the eccentric 52 with the shaft 34 imparts vertical swinging movement to the rocker 48. This swinging movement of the rocker, of course, elevates the pivotal connection of the rocker to the lever 44.

If the left-hand end of the lever 44 is unrestrained against vertical movement during rotation of the eccentric 52, the left-hand end of the lever 44 will merely swing upwardly with the rocker 48. The right-hand end of the lever, and, therefore, the punch 28 are retained in their retracted positions, indicated in Figure 5, by the spring 46. If, on the other hand, the left-hand end of the lever 44 is held against upward movement during rotation of the eccentric 52, upward swinging movement of the rocker 48 will cause elevating of the right-hand end of the lever 44, and, therefore, the punch 28*a*, as shown in Figure 6, to effect a perforating action.

Indicated at 54 is a pivotal latch which is adapted to be engaged over the left-hand end of the lever 44 for restraining the latter against upward movement, as just mentioned, so as to effect elevating of the punch 28a. The latch 54 is normally biased to this position by means of a spring 56.

In the normal condition of the apparatus, that is prior to the actuation of any of the keys on the keyboard 14, latch 54 is retained in a retracted position, shown in Figure 5, by the solenoid 30a associated with punch 28a. In this condition of the punch elevating mechanism, therefore, energizing of the one-way clutch solenoid 40 to rotate the shaft 34 and the eccentric 52 through one revolution does not impart vertical movement to the punch 28a.

If, however, the solenoid 30a is momentarily energized to release the latch 54, the latter swings to a position of engagement over the left-hand end of the lever 44. Subsequent energizing of the one-way clutch solenoid 40 to cause one revolution of the shaft 34 and eccentric 52 then results in elevating of the punch 28a to effect a perforating operation. Embodied in the mechanism 32 are means, not shown, for returning the latch 54 to its retracted position of Figure 5 in response to rotation of shaft 34 and eccentric 52 through one revolution.

The remainder of the elevating mechanisms for elevating the remainder of the punches are identical to that just described, both in structure and operation.

Figure 4:
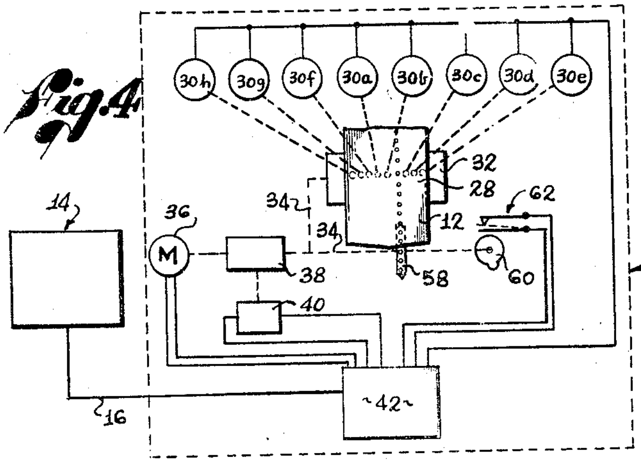
Figure 4 is a schematic circuit diagram of the pres keyboard perforator.

Advancing of the tape 12 past punches 28 is accomplished by means of a sprocket wheel 58, the teeth of which engage in a row of sprocket holes in the tape 12, as shown in Figure 4. This sprocket wheel is driven from the one-way clutch 38, so as to advance the tape 12 a predetermined distance past the punches 28 in response to each energization of the one-way clutch solenoid 40.

Also driven from the one-way clutch 38 is a cam 60 which operates a switch, generally indicated at 62, to be presently described. This switch 62 is electrically tied into the control circuitry 42 of the perforator, as shown.

The perforator 10, thus far described above, is conventional. If a more detailed description of this perforator unit is desired, therefore, reference should be had to the appropriate prior art.

As diagrammatically illustrated in Figure 4, the keyboard unit 14 is electrically connected to the control circuitry 42 of the perforator unit 10 through the previously mentioned cable 16. The keyboard unit 14 embodies certain novel electrical circuitry and mechanisms which are operative in response to actuation of the keys of the keyboard unit to cause operation of the perforator unit 10, in the manner hereinbefore briefly described, and to be presently more fully discussed.

Reference is now made to Figure 7, schematically illustrating the electrical circuitry embodied in the keyboard unit 14, and to Figure 8 illustrating in schematic fashion the electrical circuitry 42 of the perforator unit 10 as well as the other components of the perforator discussed above.

Referring first to Figure 7, the numerals 64 through 124 indicate a plurality of electrical switch devices which are operated, respectively, by the several exposure keys 18, numbered from 1 to 30. Each of the switch devices 64 through 124 embodies a first set of contacts denoted by the numerals 64m, 66m, 68m, and so on.

Each of the switch devices 64 through 124 also embodies one or more sets of additional contacts which have been denoted by the numerals of the respective switch devices and the letters *a*, *b*, *c*, *d* and *e*.

In Figure 7, these latter sets of contacts are arranged in rows paralleling the row of contacts 64m through 124m. As will presently become clear, closing of any one of the contacts in the upper one of these rows results in energizing of the punch presetting solenoid 30a, closure of any one of the contacts in the second row results in energizing of the punch presetting solenoid 30b, and so on, closure of any one of the contacts in the last row of contacts immediately above the contacts 64m through 124m resulting in energizing of the solenoid 30e. For facility of description and understanding, therefore, the five upper sets of contacts of the several switch devices 64 to 124 have, as shown in Figure 7, been assigned the same letter as their associated punch presetting solenoids.

Thus, in addition to the first-mentioned set of contacts 64m, the switch device 64 includes a set of contacts 64a. Similarly, switch device 66 comprises the contacts 66m and 66b, while switch device 112, for example, comprises contacts 112a, 112d, 112e and 112m.

These switch devices 64 through 124 are of conventional construction and are so arranged that depression of any one of the exposure keys 18 results first in closure of those of the contacts *a–e*, which are present in the corresponding switch device and, immediately thereafter, closure of the one remaining contact identified by the letter *m* in that switch device. In other words, there is a slight delay between the closure of the contacts *a* through *e* and the contacts *m* of any particular switch device. The reason for this delay will shortly become clear.

Indicated at 126 is a common lead for the several switch contacts identified by the letters *a* through *e*. The several contacts identified by the letter *a* are connected in parallel between the common lead 126 and a lead 128, while the several contacts identified by the letter *b* are connected in parallel between the common lead 126 and a lead 130. Similarly, the remaining contacts designated by the letters *c*, *d* and *e* are connected in parallel between the common lead 126 and leads 132, 134 and 136, respectively. Thus, closure of any one of the *a* contacts, such as 80a, establishes an electrical circuit between the common lead 126 and lead 128, while closure of any one of the *b* contacts establishes an electrical circuit between the common lead 126 and the lead 130. Similarly, closure of any one of the *c*, *d* or *e* contacts establishes an electrical circuit between the common lead 126 and the lead 132, 134 or 136, as the case may be.

The remaining contacts of the switch device 64 through 124, which are identified by the letter *m*, are connected in parallel between a pair of leads 138 and 140, so that closure of any one of the *m* contacts, such as 84m, for example, establishes an electrical circuit between the latter leads 138 and 140.

It will be observed in Figure 7 that switch device 124 comprises all six contact sets, namely, contact sets 124a, 124b, 124c, 124d, 124e and 124m. This latter switch device is operated by a stop key S, included in the group of three keys 22, previously described with reference to Figure 1.

As shown in Figure 7, lead 126 also forms a common lead for contacts in a set of switch devices operated by the dissolve keys 20, as will be shortly more fully described. A lead 142 extends from lead 140 to one terminal of a pair of normally open contacts 144 operated by a key H included in the group of three keys 22 on the keyboard unit 14. The other terminal of these latter contacts 144 is connected to the lead 138 via a lead 146. It will be clear, therefore, that the contacts 144 are connected in parallel with the *m* contacts of the several switch devices 64 through 124. Key H is used for advancing the tape 12 one sprocket hole at a time, as will be seen.

Indicated at 148 are a set of normally open contacts operated by the third key L in the group of three keys 22. One terminal of contacts 148 is connected to lead 140 via a lead 150. A lead 152 connects to the other terminal of contacts 148. Key L in the set of keys 22 is used for effecting continuous intermittent advancing of the tape 12 through the perforator under certain conditions, as will be presently described.

The dissolve keys, labeled 16, 32, 48, 64, 96 and 128 (frames) as previously described, operate, respectively, a series of six switch devices 154, 156, 158, 160, 162 and 164. These switch devices comprise one or more sets of normally open contacts identified by the numbers of the respective switch devices and the letters *f*, *g* or *h*, in the same manner as the contacts of the switch devices 64–124.

The *f* contacts of the switch devices 154–164 are connected in parallel between the common lead 126 and a lead 166. Similarly, the *g* and *h* contacts of these switch devices are connected between the common lead 126 and leads 168 and 170, respectively, in the manner illustrated. The keyboard unit is completed by an electric counter having leads 174 and 176.

As shown in Figure 7, the leads 126, 128, 130, 132, 134, 136, 138, 140, 152, 166, 168, 170, 174 and 176 terminate in sockets, in a receptacle 178 on the keyboard unit 14, for receiving a pronged plug on one end of the previously mentioned electrical cable 16 extending between the keyboard unit and the perforator unit 10. The other end of this cable has a second pronged plug which fits into a similar receptacle 180 (Figure 8) on the perforator unit 10 so as to electrically connect the above-mentioned leads of the keyboard unit to certain leads in the perforator unit. For convenience, the leads in the two units which are interconnected by the cable 16 have been identified by the same numerals in Figure 7 and Figure 8, the latter, as previously noted, illustrating in schematic fashion the electrical circuitry of the perforator unit 10.

Referring now to Figure 8, it will be seen that the leads 128, 130, 132, 134 and 136 connect, respectively, to one terminal of the punch presetting solenoids **30*a*, 30*b*, 30*c*, 30*d* and 30*e*, respectively. The other terminals of the latter solenoids connect to a common lead 182**.

The upper end of lead 182, as viewed in Figure 8, connects to one terminal of a set of normally closed contacts **184*a* in a relay 184. Relay contacts 184*a* are in series with a set of normally open contacts 186*a* in a relay 186. One terminal of the latter contacts 186*a* connect to the positive terminal of a rectifier network 188 through leads 190, 192 and 194. Previously described common lead 126 connects to the negative terminal of this rectifier network 188 through a set of contacts 196*a*, in a main power switch 196, a lead 198, a set of normally open contacts 200, a lead 202, and the lead 140 which extends to said negative terminal, as will be seen in the upper part of Figure 8. Contacts 200 comprise a conventional safety switch embodied in the perforator which is closed by proper insertion of a tape 12** in the perforator.

Indicated at 204 is a plug adapted for insertion in an ordinary 115 volt A.C. socket. One prong of this plug is connected via lead 206, a second set of main switch contacts **196*b* and leads 208 and 210 to one input terminal of the rectifier network 188. The other input terminal of rectifier network is connected via leads 212 and 214 to the other terminal of plug 204**.

From the description thus far of the circuitry illustrated in Figure 7, it will be clear that actuation of any one of the exposure keys 18 results in the establishment of an electrical circuit between one or more of the leads 128, 130, 132 134 and 136, and the common lead 126, depending upon which of the *a*, *b*, *c*, *d* and *e* contacts are contained in the switch device 64 through 124 of the actuated key. Referring to Figure 8 then, it will be clear, assuming the main switch 196 and safety switch 200 to be closed, that this actuation of any of the exposure keys 18 results in the completion of an electrical circuit from one terminal of one or more of the punch presetting solenoids **30*a* through 30*e*, through leads 128–136, as the case may be, to the common lead 126 and thence through main switch contacts 196*a*, lead 198, safety switch 200, and lead 140 to the negative terminal of the rectifier network 198**.

Lead 138, which forms one common lead for the several *m* contacts of the switch devices 64 through 124, is connected via the cable 16, to one terminal of the relay coil 186C of relay 186, as shown in Figure 8. The other terminal of this relay coil 186C is connected to the positive terminal of the rectifier network 188 via the leads 192 and 194. It will be clear, therefore, that closure of the *m* contact of any one of the switch devices 64 through 124, in Figure 7, by actuation of its respective exposure key 18, to establish an electrical connection between the leads 138 and 140, the latter connecting to the negative terminal of rectifier 188, as just mentioned, results in energizing of the relay coil 186C and closing of its normal open contacts **186*a*. Closure of the contacts 186*a*, of course, completes an electrical circuit from the common lead 182, for the punch presetting solenoids 30*a* through 30*e*, through the normally closed contacts 184*a* of the relay 184, now closed contacts 186*a* of relay 186, and leads 190, 192 and 194 to the positive terminal of the rectifier 188**.

It will be recalled that when one of the exposure keys 18 is depressed, the *a*, *b*, *c*, *d* and *e* contacts, as the case may be, of the corresponding switch device 64 through 124 are actuated first and subsequently the *m* contact of that switch device is closed. From this description, it is clear that depression of any one of the exposure keys 18 results first in closure of the *a*, *b*, *c*, *d* or *e* contacts, as the case may be, of the corresponding switch device 64–124 to complete a circuit from one terminal of the correspondingly lettered one or ones of the solenoids **30*a*–30*e* to the negative terminal of the rectifier 188**, and subsequently in closure of the *m* contact of the corresponding switch device 64–124 to energize the relay 186 and thereby complete a circuit from the common lead 182, connected to the other terminals of the solenoids, to the positive terminal of the rectifier 188.

Said correspondingly lettered solenoid or solenoids **30*a*–30*e* are thereby energized to release the latches 54 (Figures 5 and 6) embodied in their respective punch elevating mechanisms. These mechanisms are thereby preset for subsequent elevating of the preselected ones of the punches 28*a* to 28*e*** in the manner described below.

Thus, depression of any one of the exposure keys 18 results in conditioning of the punch elevating mechanism 32 (Figure 4) for elevating of that punch or those punches 28 corresponding to the *a*, *b*, *c*, *d* and *e* contacts present in the switch device corresponding to the depressed key. A study of the circuitry will show that the punch or punches which are thus preset for subsequent elevation to perforate tape 12, in response to actuation of any given exposure key, are those which will form on the tape a control group 26 having an equivalent numerical value equal to numerical label on the depressed key. Thus, for example, depression of the exposure key numbered 14 results in presetting of punches **28*b*, 28*c* and 28*d*** for subsequent elevation to form a control group containing perforations in control positions *b*, *c*, and *d*. Such a control group, of course, has an equivalent numerical value of 14.

Embodied in the relay 186 are a second set of normally open contacts **186*b*, one terminal of which is connected to the negative D.C. supply lead 140 through a lead 216 and the other terminal of which is connected to the upper end of the relay coil 184*c* via a lead 218. The lower end of this latter coil is connected to the positive terminal of the rectifier network 188 through the leads 192 and 194**.

Closure of the relay contacts **186*b*, in response to energizing of relay 186, therefore, results in energizing of relay 184. Energizing of relay 184, of course, results in opening of its normally closed contacts 184*a*, thereby breaking the electrical circuit between the common lead 182 of the punch presetting solenoids and the positive supply lead 192**. The punch presetting solenoids, therefore, deenergize.

From what has just been said, it will be clear that depression of any one of the exposure keys 18 results first in conditioning of preselected ones of the solenoids 30*a*–30*e* for energization by connection of their left-hand leads, as viewed in Fig. 8 with the common supply lead 126 and subsequently in energizing of the relay 186 and closure of its normally open contacts 186*a* to energize the preselected punch presetting solenoids. Subsequent energization of the relay 184 and opening of its normally closed contacts 184*a*, in response to energizing of relay 186, again deenergizes the punch presetting solenoids.

The preselected punch solenoids are, therefore, energized only for a brief interval of time, determined by the time delay between the energizing of the relay 186 and the relay 184. This delay, which is a function of the mechanical and electrical delay in the circuit, is extremely brief but has been found sufficient to accomplish release of the latches 54 in the punch elevating mechanisms associated with the preselected solenoids. The reason for immediately deenergizing the punch presetting solenoids will become apparent shortly.

Indicated at 40 in Figure 8 is the clutch solenoid, illustrated in Figure 4, for effecting momentary release of the one revolution clutch 38, to accomplish elevating of those punches which, as described above, have been preselected by selective energizing of the punch presetting solenoids 30*a* to 30*e*. Energizing of clutch 40 also results in advancing of the tape 12, as will now be described.

As shown in Figure 8, one terminal of the solenoid 40 is connected to the lead 194 extending to the positive terminal of the rectifier 188. The other terminal of the solenoid 40 is connected to a lead 220 which connects to one terminal of a set of normally closed contacts 222*a* of an anti-repeat relay 222. The other terminal of contacts 222*a* is connected via a lead 224 to one terminal of contacts 62*a* in the switch means 62, previously referred to.

These switch means 62 comprise a double-throw switch having the contacts 62*a* as a normally closed side thereof. The center or common terminal of the switch 62, which is connected to the movable leaf operated by the cam 60 in Figure 4, is connected via a lead 226 to one terminal of a pair of normally open contacts 222*b* in the anti-repeat relay 222, and via leads 226 and 228 to one terminal of a pair of normally open contacts 186*d* in the aforementioned relay 186. The other terminal of these latter contacts is connected to the lead 216 extending to the negative supply lead 140, as shown in Figure 8.

The remaining terminal of the switch 62, comprising the terminal of the normally open contacts 62*b* of that switch, is connected via a lead 230 to the upper end of the coil 222*c* of the anti-repeat relay 222, the lower end of which is connected to the positive supply lead 194. A lead 232 connects the lead 230 and the other terminal of the set of normally open contacts 222*b* of the anti-repeat relay.

From the description just given, it will be seen that when switch 62 is in its normal condition, illustrated in Figure 8, which it occupies during the normal inoperative condition of the present keyboard perforator, an energizing circuit through the one revolution clutch solenoid 40 is completed by closure of the normally open contacts 186*d* of the relay 186 in response to energizing of the latter relay in a manner previously described. Thus, upon closure of the relay contacts 186*d*, a circuit may be traced from the negative terminal of the rectifier 188 through leads 140, 216, now closed contacts 186*d*, leads 228, 226, the now closed contacts 62*a* of the switch 62, lead 224, now closed contacts 222*a* of the anti-repeat relay 222 and lead 220 to the clutch solenoid 40, and thence back to the positive terminal of the rectifier 188 through the lead 194.

As previously described, when the clutch solenoid 40 is thus energized, the one revolution clutch 38 (Figure 4) is released. As shown in Figure 8, one terminal of motor 36 is connected to one prong of the A.C. plug 204 through leads 234 and 214. The other terminals of the motor 36 are connected to a relay 36R, one terminal of which, in turn, is connected through leads 236, 238, 208, contacts 196*b* of the main power switch 196, and the lead 206 to the other prong of the A.C. supply plug 204. Thus, when plug 204 is inserted in an A.C. receptacle and the main switch 196 is closed, relay 36R is energized to complete the energizing circuit for the motor 36.

When the one revolution clutch solenoid 40 is energized as described above, therefore, motor 36 is operating. One revolution clutch 38 is of conventional construction and design, as previously described, and operates in such a way that each time the clutch solenoid 40 is energized, the driven shaft 34, connected to the clutch, is turned through one revolution. The construction of the perforator unit 10 is such that during this one revolution of the shaft 34, the punch elevating mechanism 32 is first operated to elevate those punches 28 whose latches 54 have been released by the above-described, selective energizing of the punch presetting solenoids 30*a* through 30*e*. Tape 12 is thereby formed with a perforated control group having an equivalent numerical value equal to the numerical label displayed on the depressed exposure key.

Simultaneously, rotation of the cam 60 on the shaft 34 operates to move the leaf of the switch 62 to open the normally closed contact 62*a* and close the normally open contact 62*b* of that switch. This operation of the switch means 62 results in energizing of the anti-repeat relay 222, as described below, to prevent repeated energizing of the clutch solenoid 40.

Finally, during the latter portion of the revolution of shaft 34, in response to release of the one revolution clutch 38, sprocket 58 is turned to advance the tape 12 through the perforator unit 10 a distance equal to the spacing between the adjacent control groups 26 on the tape. Tape 12 is thereby positioned with an unperforated portion in registry with the punches 28 so as to condition the apparatus for a subsequent perforating operation.

Upon completion of this one revolution of the shaft 34, the punch elevating mechanism 32 will have been returned to its normal condition (Figure 5) wherein the several latches 54 are held in retracted position by means of the solenoids 30*a* through 30*e*, and the several punches 28 are retracted. Also, cam 60 is returned to its normal position to release the leaf of switch 62 for return, under the action of a spring, not shown, therein, to its normal position wherein switch contacts 62*a* are closed and switch contacts 62*b* are open.

As mentioned above, operation of switch 62 by cam 60 during the single revolution of the shaft 34 results in energizing of the anti-repeat relay 222. Thus, when the switch contacts 62*b* are closed by the cam 60, it will be seen that a circuit may be traced from the positive terminal of the rectifier 188 through the lead 194 to the lower end of the coil 222*c* of the anti-repeat relay and thence from the upper end of this coil through lead 230, now closed contact 62*b* of switch 62, leads 226 and 228, contacts 186*d* of relay 186, which we will assume, for the present, to be energized so that the contacts 186*d* are closed, and thence through leads 216 and 140 to the negative terminal of the rectifier 188. The coil 222*c* of the anti-repeat relay 222 is thereby energized to open its normally closed contacts 222*a* and close its normally open contacts 222*b*. At this time, therefore, both the contacts 62*a* of the switch 62 and the contacts 222*a* of the anti-repeat relay 222 are open.

When either one or the other or both of these latter contacts 62*a* and 222*a* are open, of course, the circuit between the lead 220 of the clutch solenoid 40 and the lead 228, which is presently assumed to be connected to the negative terminal of the rectifier 188 through the contacts 186*d* of the relay 186 and leads 216, 140, is broken. Clearly then, solenoid 40 deenergizes.

Switch 62 is only momentarily operated by the cam 60. Accordingly, this switch is returned to its normal condition of Figure 8, wherein the switch contacts 62*b* are open, immediately after energizing of the anti-repeat relay 222. The latter relay is, however, retained in energized condition as follows. It will be recalled that relay 186 is assumed to be energized so that its contacts 186*d* are closed. Closure of the contacts 222*b*, in response to energizing of the anti-repeat relay by momentary closure of the contact 62*b*, therefore, completes a circuit from the upper end of the anti-repeat relay coil 222*c* through lead 232, contacts 222*b*, leads 226, 228, contacts 186*d* and leads 216 and 140 to the negative terminal of the rectifier 188. Since the lower end of the anti-repeat relay coil is connected to the positive terminal of the rectifier through the lead 194, the anti-repeat relay is locked in energized condition so long as the relay 186 is energized. Accordingly, so long as the latter relay remains energized, contacts 222*a* of the anti-repeat relay remain open to retain the clutch solenoid 40 in a deenergized condition.

The reason for the anti-repeat relay will be apparent. Thus, shaft 34 of the perforator unit 10 is rotated through its one revolution, in response to each energizing of the one revolution clutch solenoid 40, in a relatively short period of time on the order of a few microseconds. This one revolution of the shaft 34 occurs, therefore, before the selected exposure key of the keyboard 14 can be released by the operator. So long as an exposure key is depressed, of course, relay 186 remains energized. With the latter relay energized, its contacts 186*d* are closed with the result that upon return of the switch 62 to its normal condition of Figure 8, in response to rotation of the shaft 34 through one revolution, the earlier described energizing circuit through the clutch solenoid 40 would again be completed and the clutch 38 would be again released to advance the tape 12. None of the punches 28, of course, would be operated during this subsequent rotation of the shaft 34, since, as previously mentioned, all of the punch presetting solenoids 30*a* through 30*e* are immediately deenergized by energizing of the relay 184 and opening of its contacts 184*a* in the common lead 182 for the latter solenoids.

Accordingly, therefore, in the absence of the anti-repeat relay 222, the shaft 34 would be continuously driven so long as one of the exposure keys 18 on the keyboard were depressed. Since the time required to normally depress and release one of the exposure keys is sufficiently long to enable several rotations of the shaft 34 to occur, the tape 12 would be advanced a distance of several control groups. This, of course, is undesirable and is avoided by the aforedescribed operation of the anti-repeat relay 222.

It will be recalled that the key H in the group of three keys 22 on the keyboard unit 14 operates a set of contacts 144 in parallel with the *m* contacts of the several switch devices 64 through 124. Accordingly, depression of the key H causes operation of the perforator unit 10 in the manner just described except that none of the punch presetting solenoids 30*a* through 30*e* will be energized. Accordingly, each depression of the key H results in advancing of the tape 12 through the perforator a distance equal to the spacing between adjacent control groups 26.

As described, the set of contacts 148 operated by the key L in the group of three keys 22 on the keyboard has one terminal connected to a lead 152 and the other terminal connected to the lead 140 through a lead 150. Referring to Figure 8, therefore, it will be seen that operation of key L to close the contacts 148 completes an electrical circuit from the lead 140, extending to a negative terminal of rectifier 188, and lead 152 which connects to lead 220 of the clutch solenoid 40. It is clear, therefore, that so long as the key L is depressed, clutch solenoid 40 remains energized. The one revolution clutch 38 thus remains released and the shaft 34 is continuously driven by the motor 36 to continuously feed the tape 12 through the perforator. As in the case of key H, however, the several punch presetting solenoids 30*a* through 30*e* remain deenergized. Key L is employed to feed a leader portion of the tape 12 through the perforator or to feed the tape 12 out of the perforator after completion of a perforating operation.

Indicated at 240 in Figure 8 is a normally open, manually operable switch located exteriorly of the perforator housing. One terminal of this switch connects to lead 126, via a lead 242 and the other terminal of the switch connects to the clutch solenoid lead 220 through a lead 244. With the main power switch 196 and the safety switch 200 closed, therefore, closure of the switch 240 results in energizing of the clutch solenoid 40 and continuous feeding of the tape 12 through the perforator. Switch 240 is a part of the conventional perforator.

Returning now to Figure 7, it will be recalled that the switch devices 154, 156, 158, 160, 162 and 164 operated by the dissolve keys 20 comprise contacts which are connected between the common lead 126 and one of the three leads 166, 168 and 170. Thus, operation of dissolve key 16, comprising contacts 154*f*, completes an electrical circuit from the common lead 126 to the lead 166. Similarly, operation of the dissolve key 96, comprising contacts 162*f* and 162*h*, completes an electrical circuit from the common lead 126 to leads 166 and 170.

Referring now to Figure 8, it will be seen that leads 166, 168 and 170 are connected to one terminal of a group of three punch presetting solenoids 30*f*, 30*g* and 30*h*, respectively. As previously mentioned, the three punch presetting solenoids 30*f*, 30*g* and 30*h* are associated with the punches which perforate the dissolve section of the tape, illustrated in Figure 3.

The other terminals of the three latter solenoids are connected to the positive terminal of rectifier 188 through the common lead 194. From this description, it will be seen that depression of any one of the dissolve keys 20 completes a circuit or circuits from the leads 166, 168 and 170, of the solenoids 30*f*, 30*g* and 30*h*, depending upon which of the *f*, *g* and *h* contacts are present in the switch device operated by the depressed dissolve key, and the lead 126. In the normal operating condition of the perforator, as previously described, lead 126 is connected to the negative terminal of the rectifier 188. Accordingly, depression of any one of the exposure keys results in energizing of the corresponding ones or one of the three punch presetting solenoids 30*f*, 30*g* and 30*h*.

The punch elevating mechanism 32 comprises three separate punch elevating mechanisms, of the character illustrated in Figures 5 and 6, associated with each of the latter solenoids. Thus, when any one of the latter solenoids is energized, the latch 54 of the corresponding punch mechanism is released to condition the corresponding punch 28 for elevation to perforate the tape 12 in response to rotation of the perforator shaft 34. Immediately upon release of the operated dissolve key 20, of course, the corresponding punch presetting solenoid or solenoids are deenergized. The latch or latches 54 of the corresponding punch elevating mechanisms, however, remain in extended position over the ends of their respective lever arms 44, so that the corresponding punches will be conditioned for elevation by rotation of the shaft 34, as mentioned above.

It will be clear, of course, that operation of the dissolve keys 20 does not result in energizing of the solenoid clutch 40 to elevate the punches and advance the tape 12. In order to perforate the dissolve section of the tape 12, therefore, one of the dissolve keys 20 must be first operated, as just described, and subsequently one of the exposure keys 18 must be operated to effect energizing of the clutch solenoid 40, elevation of the preselected punches 28 to perforate the tape 12, and advancing of the tape through the perforator.

Operation of both a dissolve key and an exposure key, of course, results in perforation of both the dissolve and exposure sections of the tape. The reason for this is obvious since a dissolve will never be effected unless a particular exposure value or printing light setting is established in the printer even though such exposure value or light setting is the same as the previous setting. In such a case, of course, the exposure section of a control group 26, wherein the dissolve section is also perforated, will contain the same perforations as the exposure section of the previous control group 26.

This completes the structural description of the present keyboard perforator.

*Operation*

Operation of the present keyboard perforator is believed to be obvious in the light of the foregoing description. Thus, to condition the apparatus for operation, a tape 12 must be properly threaded in the perforator unit 10 to close the safety switch 200 and the main power switch 196 must be closed to energize the rectifier 188 and the motor 36.

With the apparatus thus conditioned for operation, the leader portion of the tape 12 may be automatically threaded through the perforator 10 by depression of the key L in the group of three keys 22 on the keyboard 14. This results in continued advancing of the tape through the perforator in the manner previously described.

Upon aligning of the desired portion of the tape with the punches 28, the key L is released to terminate automatic threading of the tape. The necessary number of coded control groups 26 are now formed in the tape 12 by selective operation of the several exposure keys 18 and dissolve keys 20. Thus, if a particular control group is to be coded to establish a printing light setting of 18 in the printer, exposure key 18 is depressed. Similarly, a control group may be coded to establish any other desired printing light setting from one to thirty by operation of the proper exposure key.

If a particular control group is to be coded to effect a dissolve at a particular rate, one of the dissolve keys 20, bearing indicia corresponding to the proper dissolve rate, is depressed. As previously described, this conditions one or more of the punches 28*f* through 28*h* for perforating the dissolve section of the particular control group. As mentioned, however, such operation of a dissolve key does not effect energizing of the clutch solenoid 40 to accomplish the perforating operation and advancing of the tape. In order to effect these latter operations, a selected one of the exposure keys 18 must be depressed after depression of the selected dissolve key. Operation of the dissolve key and an exposure key, of course, results in perforating of both sections of the tape 12.

Tape 12 is thus formed with the desired number of coded control groups, providing the necessary number of light changes and/or dissolves. The last control group on the control tape is coded by operating the stop button S in the group of three buttons 22, on the keyboard 14. In Figure 7, it will be observed that the switch device 124 operated by this stop key contains all five contacts 124*a* through 124*e*. Accordingly, when the stop key S is actuated, all five punch presetting solenoids 30*a* through 30*e* are energized. The last control group on the control tape is, therefore, formed with a control group containing perforations in all five control positions *a* through *e* in the exposure section of the tape. As previously mentioned and described in the aforementioned co-pending applications, such a control group effects automatic termination of the printing apparatus.

As shown in Figure 8, lead 174 for the counter 172 is connected to one terminal of a set of normally open contacts 184*d* in the relay 184. The other terminal of these latter contacts is connected, as shown, to the lead 208 extending to the A.C. plug 204 through the main power switch 196. The other lead 176 of the counter 172 connects to lead 214 extending to the A.C. plug 204.

It will be apparent, therefore, that each time relay 184 is energized in the manner hereinbefore described, with resultant closing of its contacts 184*d*, counter 172 is energized. The counter is thereby operated to indicate a count. This counter provides an indication of the number of control groups which have been formed on the tape. The counter is of the resettable type to enable the same to be set to a zero reading prior to operation of the apparatus.

As preliminarily indicated, while the illustrative embodiment of the invention has related to a perforator for coding a control tape to be used in an automatic film printer of the character disclosed in the aforementioned co-pending applications, it will be apparent that the present apparatus may be used for coding tape to be employed in other types of control equipment. Also, various coding systems other than that disclosed herein may be employed and the tape may be marked rather than perforated.

It will be apparent, therefore, that while a preferred form of the invention has been disclosed for illustrative purposes, numerous modifications in design, arrangement of parts and instrumentalities are possible within the scope of the following claims.

We claim:

1. In tape coding apparatus of the character described, a plurality of electrically presettable, selectively operable coding means for coding a tape, each coding means having a normal inoperative condition wherein the respective coding means is deactivated against operation to code a tape and being preset for operation to code a tape by momentary energizing of the respective coding means; electrical drive means for operating those coding means which are preset; a keyboard device including a plurality of selectively operable keys each associated with preselected coding means; circuit means for momentarily energizing the coding means associated with each key upon actuation of the latter to preset the associated coding means, said circuit means including switch means operated by each key for conditioning the coding means associated with the respective key for energization by partially completing energizing circuits through said associated coding means, electrical relay means for momentarily completing the energizing circuits of the coding means so conditioned upon operation of the relay means, and circuit means including switch means operated by each key for operating said relay means; circuit means including said relay means for energizing said drive means upon operation of said relay means whereby to operate the preset coding means; and means operated by said drive means for resetting said preset coding means to normal condition after operation thereof by said drive means.

2. In tape coding apparatus of the character described, a plurality of electrically presettable, selectively operable coding means for coding a tape, each coding means having a normal inoperative condition wherein the respective coding means is deactivated against operation to code a tape and being preset for operation to code a tape by momentary energizing of the respective coding means; electrical drive means for operating those coding means which are preset; a keyboard device including a plurality of selectively operable keys each associated with preselected coding means; circuit means for momentarily energizing the coding means associated with each key upon actuation of the latter to preset the associated coding means, said circuit means including first switch means operated by each key for partially completing an energizing circuit through the coding means associated with the respective key whereby to condition said associated coding means for energization, relay means having first contact means in circuit with said coding means for momentarily completing the energizing circuit of the coding means conditioned for energizing by operation of said first switch means of a given key, and circuit means including second switch means operated by each key substantially simultaneously with operation of the first switch means of the respective key for operating said relay means to momentarily energize said associated coding means; circuit means including second contact means in said relay means for energizing said drive means upon operation of relay means whereby to operate the coding means which are preset; and means operated by said drive means for resetting said preset coding means to normal condition after operation of the latter means by said drive means.

3. In tape coding apparatus of the character described, a plurality of electrically presettable, selectively operable coding means for coding a tape, each coding means having a normal inoperative condition wherein the respective coding means is deactivated against operation to code a tape and being preset for operation to code a tape by momentary energizing of the respective coding means; electrical drive means for operating those coding means which are preset; a keyboard device including a plurality of selectively operable keys each associated with preselected coding means; circuit means for momentarily energizing the coding means associated with each key upon actuation of the latter, said circuit means including a source of electrical power, first switch means operated by each key for connecting one terminal of said source to one terminal of the coding means associated with the respective key, relay means including first contact means for momentarily connecting the other terminal of said source to the other terminals of said coding means upon operation of said relay means, and circuit means including second switch means operated by each key for operating said relay means substantially simultaneously with operation of the first switch means of the respective key whereby operation of each key momentarily energizes and thereby presets its associated coding means; circuit means including second contact means in said relay means for energizing said drive means upon operation of said relay means to operate the preset coding means; and means for resetting said preset coding means to normal condition after operation of the latter means by said drive means.

4. In tape coding apparatus of the character described, a plurality of electrically presettable, selectively operable coding means for coding a tape, each coding means having a normal inoperative condition wherein the respective coding means is deactivated against operation to code a tape and being preset for operation to code a tap by momentary energizing of the respective coding means; electrical drive means for operating those coding means which are preset; a keyboard device including a plurality of selectively operable keys each associated with preselected coding means; circuit means for momentarily energizing the coding means associated with each key upon actuation of the latter to preset the associated coding means, said circuit means including a source of electrical power, first normally open switch means operated by each key for connecting one terminal of the coding means associated with the respective key to one terminal of said source upon operation of the key, a pair of relays, one relay having a first set of normally open contacs and the other relay having a first set of normally closed contacts, means connecting said contacts in series between the other terminals of said coding means and the other terminal of said source, a circuit for energizing said other relay to open its first set of contacts upon energizing of said one relay including a second set of normally open contacts in said one relay, a circuit for energizing said one relay to close its first and second contacts upon operation of any key including second normally open switch means operated by each key substantially simultaneously with operation of the first switch means of the respective key; circuit means including a third normally open contact in said one relay for energizing said drive means upon energizing of the latter relay; and means driven by said drive means for resetting the preset coding means after operation of the latter by said drive means.

5. In tape coding apparatus of the character described, a coding device for receiving a tape to be coded comprising a plurality of presettable tape coding means adapted to be preset to form preselected coded control information on the tape, and selectively operable mechanism for initially operating those coding means which are preset to form coded information on the tape and thereafter advancing said tape a predetermined distance past said coding means; and a keyboard device including a plurality of selectively operable keys, means operated by each key of a first group of said keys to preset one group of said coding means, and means operated by each key of a second group of said keys to first preset a second group of said coding means and then operate said mechanism to operate those coding means which are preset in both of said groups of coding means, and advance the tape said predetermined distance.

6. The subject matter of claim 5 wherein each of said coding means comprises a selectively energizable solenoid means which has a normal state of energization and is placed in another state of energization by operation of certain keys and a presetting means controlled by each solenoid means, each presetting means being retained in one position wherein its respective coding means is deactivated when its respective solenoid means is in said normal state and being placed in another position to preset its respective coding means in response to operation of its respective solenoid means to said other state, means for resetting all of the presetting means which occupy said other position to said one position in response to operation of said mechanism, and solenoid deactivating means for returning all of the solenoid means of the second group of coding means to said normal state immediately upon the latter means being placed in said second state and before resetting of the presetting means by said mechanism.

7. The subject matter of claim 5 wherein said deactivating means comprises first relay means operated any one of said second group of keys to complete an energizing circuit to one terminal of the solenoid means of the second group of coding means, and second relay means controlled by said first relay means for immediately breaking said circuit.

8. In tape coding apparatus of the type comprising a tape coding device including a plurality of presettable tape coding means, selectively energizable solenoid means for presetting the respective tape coding means, and mechanism for sequentially operating the tape coding means which are preset and thereafter advancing the tape a predetermined distance, the improvements comprising control means for said coding device including a keyboard having a plurality of selectively operable keys each associated with at least one of said solenoid means, means operated by each key in a first group of said keys for operating the associated solenoid means to preset the corresponding coding means, first means operated by each key in the second group of said keys for operating the associated solenoid means to preset the corresponding coding means, and second means operated by each key of said second group for operating said mechanism to operate the coding means preset by actuation of a key of the second group as well as the coding means preset by prior actuation of a key of the first group and thereafter advance the tape.

9. The subject matter of claim 8 including solenoid deactivating means for deactivating the solenoid means operated by the second group of keys immediately after operation of the latter solenoid means.

10. In tape coding apparatus of the character described, a coding device for receiving a tape to be coded comprising a plurality of selectively energizable, presettable tape coding means which are preset for operation to code a tape by energization of the respective coding means, and selectively energizable mechanism for operating the preset tape coding means to code a tape and thereafter advancing the latter a predetermined distance; and control means for said coding device including a keyboard device having a plurality of selectively operable keys, switch means operated by each key, first relay means controlled by said switch means for operating said mechanism in response to actuation of any key, said first relay means remaining in operated condition until the actuated key is released, second anti-repeat relay means actuated by operation of the mechanism for deactuating the latter against repeated operation and controlled by said first relay means so as to be retained in actuated condition wherein said mechanism is deactuated until release of the actuated key.

References Cited in the file of this patent

UNITED STATES PATENTS

| | | |
|---|---|---|
| 796,775 | Pollak | Aug. 18, 1903 |
| 1,174,427 | Krum | Mar. 7, 1916 |
| 2,353,034 | Holt | July 4, 1944 |
| 2,377,801 | Mills et al. | June 5, 1945 |
| 2,392,275 | Tholstrup | Jan. 1, 1946 |